US012802865B2

(12) United States Patent
Matsushita

(10) Patent No.: US 12,802,865 B2
(45) Date of Patent: Nov. 17, 2026

(54) ELECTRONIC COMPONENT

(71) Applicant: Murata Manufacturing Co., Ltd., Kyoto-fu (JP)

(72) Inventor: Yosuke Matsushita, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 766 days.

(21) Appl. No.: 18/332,188

(22) Filed: Jun. 9, 2023

(65) Prior Publication Data

US 2023/0317355 A1 Oct. 5, 2023

Related U.S. Application Data

(63) Continuation of application No. PCT/JP2021/044892, filed on Dec. 7, 2021.

(30) Foreign Application Priority Data

Dec. 14, 2020 (JP) ................................ 2020-206876

(51) Int. Cl.
*H01F 27/28* (2006.01)

(52) U.S. Cl.
CPC ..... *H01F 27/2804* (2013.01); *H01F 27/2809* (2026.08)

(58) Field of Classification Search
CPC .................... H01F 27/2804; H01F 2027/2809
See application file for complete search history.

(56) References Cited

U.S. PATENT DOCUMENTS

| | | | | |
|---|---|---|---|---|
| 5,742,210 A * | 4/1998 | Chaturvedi | H01P 5/185 333/116 |
| 6,580,350 B1 * | 6/2003 | Kobayashi | H01F 17/0013 336/200 |
| 9,893,407 B2 * | 2/2018 | Ootsuka | H01P 5/187 |
| 2012/0049974 A1 | 3/2012 | Masuda et al. | |

(Continued)

FOREIGN PATENT DOCUMENTS

| | | |
|---|---|---|
| JP | 2001044038 A * | 2/2001 |
| JP | 2004063488 A * | 2/2004 |

(Continued)

OTHER PUBLICATIONS

International Search Report for PCT/JP2021/044892 dated Feb. 22, 2022.

*Primary Examiner* — Malcolm Barnes
(74) *Attorney, Agent, or Firm* — McDonald Hopkins LLC

(57) ABSTRACT

An electronic component includes a stacked body in which a plurality of insulating layers are stacked, wherein the plurality of insulating layers include a first insulating layer having a first surface. A first conductor pattern portion and a second conductor pattern portion adjacent to the first conductor pattern portion are disposed on the first surface. A first interlayer connection conductor is disposed to extend through one of the first insulating layer and a second insulating layer in a thickness direction of the stacked body, the second insulating layer being an insulating layer in contact with the first surface as one of the plurality of insulating layers. The first conductor pattern portion has a first region for connection to the first interlayer connection conductor. The first interlayer connection conductor is connected to the first conductor pattern portion.

17 Claims, 8 Drawing Sheets

(56) References Cited

U.S. PATENT DOCUMENTS

| | | | | |
|---|---|---|---|---|
| 2015/0014042 | A1* | 1/2015 | Noguchi ................ | H05K 1/165 174/262 |
| 2015/0381134 | A1* | 12/2015 | Tanaka ..................... | H03H 7/09 333/132 |
| 2016/0217905 | A1* | 7/2016 | Yang ...................... | H05K 1/113 |
| 2017/0025219 | A1* | 1/2017 | Nagai ................. | H01F 17/0013 |

FOREIGN PATENT DOCUMENTS

| | | | |
|---|---|---|---|
| JP | 2006-114801 | A | 4/2006 |
| JP | 2009-290677 | A | 12/2009 |
| JP | 2012-049694 | A | 3/2012 |
| JP | 2016-012770 | A | 1/2016 |
| JP | 5964583 | B2 | 7/2016 |

* cited by examiner

ELECTRONIC COMPONENT

CROSS REFERENCE TO RELATED APPLICATION

This is a continuation of International Application No. PCT/JP2021/044892 filed on Dec. 7, 2021 which claims priority from Japanese Patent Application No. 2020-206876 filed on Dec. 14, 2020. The contents of these applications are incorporated herein by reference in their entireties.

BACKGROUND OF THE DISCLOSURE

Field of the Disclosure

The present disclosure relates to an electronic component.

Description of the Related Art

An electronic component may be formed by stacking a plurality of insulator layers. Such an electronic component is described, for example, in each of Japanese Patent Laid-Open No. 2012-49694 (PTL 1), Japanese Patent Laid-Open No. 2016-12770 (PTL 2), and Japanese Patent Laid-Open No. 2006-114801 (PTL 3). A conductor pattern is formed on a surface of each of some insulator layers. In order to attain electrical connection to the conductor pattern in the thickness direction, an interlayer connection conductor is provided. In this case, some region for connection is provided in the conductor pattern, and the interlayer connection conductor is connected to this region. In order to attain stable connection, the interlayer connection conductor is disposed as close as possible to the center of this region when viewed in a plan view.

PTL 1: Japanese Patent Laid-Open No. 2012-49694
PTL 2: Japanese Patent Laid-Open No. 2016-12770
PTL 3: Japanese Patent Laid-Open No. 2006-114801

BRIEF SUMMARY OF THE DISCLOSURE

As the density of the conductor pattern inside the electronic component is increased, it is required to reduce the size of a region prepared for connection in the conductor pattern. It is also required to reduce a clearance between the region for connection and another adjacent conductor pattern. Pursuit of these, however, leads to an increase in such a risk that the position of the interlayer connection conductor is displaced with respect to the conductor pattern when forming the interlayer connection conductor to result in short circuit of the interlayer connection conductor with another undesired conductor pattern. When the arrangement of the conductor pattern and the interlayer connection conductor is designed by providing a sufficient clearance in order to avoid the risk of short circuit, a high density cannot be achieved.

Thus, it is a possible benefit of the present disclosure to provide an electronic component to avoid a risk of short circuit while achieving a high density.

In order to achieve the above possible benefit, an electronic component according to the present disclosure includes a stacked body in which a plurality of insulating layers are stacked. The plurality of insulating layers include a first insulating layer having a first surface. A first conductor pattern portion and a second conductor pattern portion are disposed on the first surface, the second conductor pattern portion being adjacent to the first conductor pattern portion with the second conductor pattern portion being separated from the first conductor pattern portion. A first interlayer connection conductor is disposed to extend through one of the first insulating layer and a second insulating layer in a thickness direction of the stacked body, the second insulating layer being an insulating layer in contact with the first surface as one of the plurality of insulating layers. The first conductor pattern portion has a first region for connection to the first interlayer connection conductor. When viewed in a direction perpendicular to the first surface, the first interlayer connection conductor is connected to the first conductor pattern portion in a state in which the first interlayer connection conductor is displaced from a center of the first region in a direction away from the second conductor pattern portion.

According to the present disclosure, since the first interlayer connection conductor is connected to the first conductor pattern portion in the state in which the first interlayer connection conductor is displaced from the center of the first region in the direction away from the second conductor pattern portion, the first interlayer connection conductor is less likely to be electrically connected to the second conductor pattern portion even when the first interlayer connection conductor is displaced from the position due to an error, thereby avoiding a risk of short circuit while achieving a high density.

DETAILED DESCRIPTION OF THE DISCLOSURE

A dimensional ratio shown in figures does not necessarily represent an actual dimensional ratio exactly, and may be shown in an exaggerated manner for convenience of explanation. In the description below, when reference is made to a concept regarding the upward direction or downward direction, the upward direction or downward direction is not necessarily meant in an absolute sense, but may be meant in a relative sense in an illustrated posture.

First Embodiment

Figure 1:
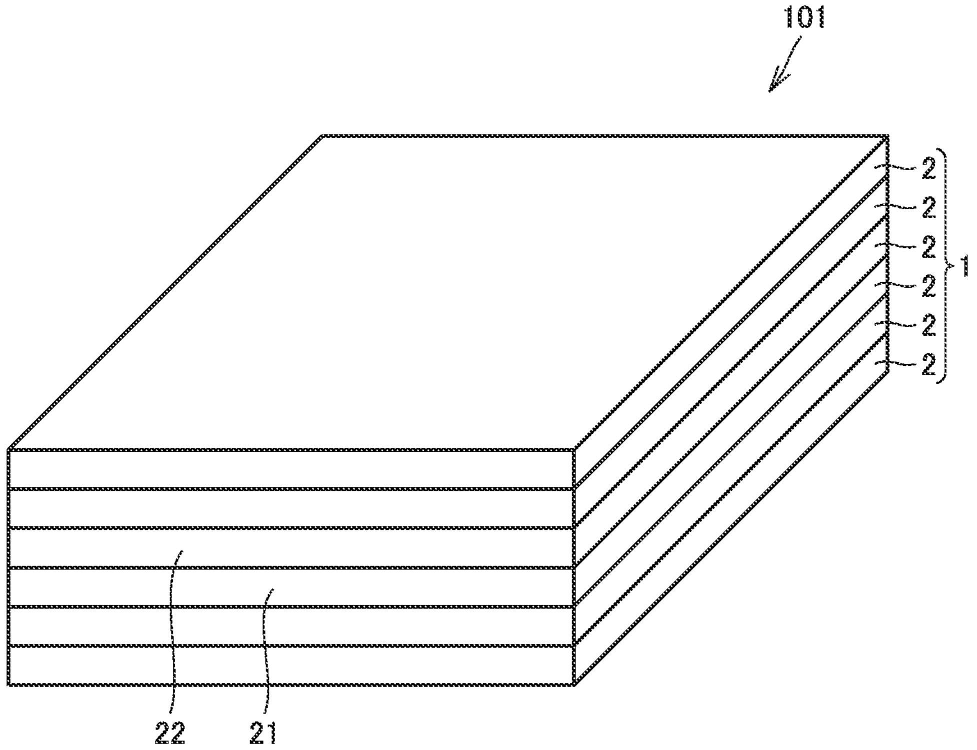
FIG. 1 is a perspective view of an electronic component according to a first embodiment of the present disclosure.

An electronic component according to a first embodiment of the present disclosure will be described with reference to FIGS. 1 to 6. FIG. 1 shows an appearance of an electronic component 101 according to the present embodiment.

Figure 2:
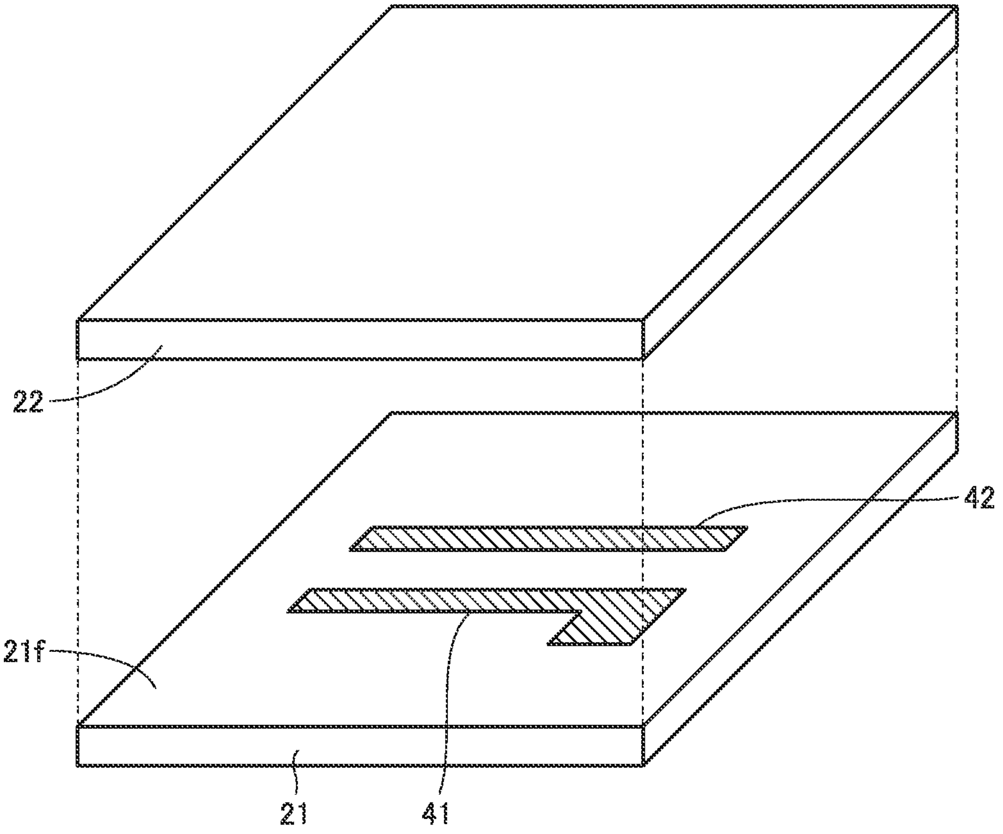
FIG. 2 is an exploded view of a portion of the electronic component according to the first embodiment of the present disclosure.
Figure 3:
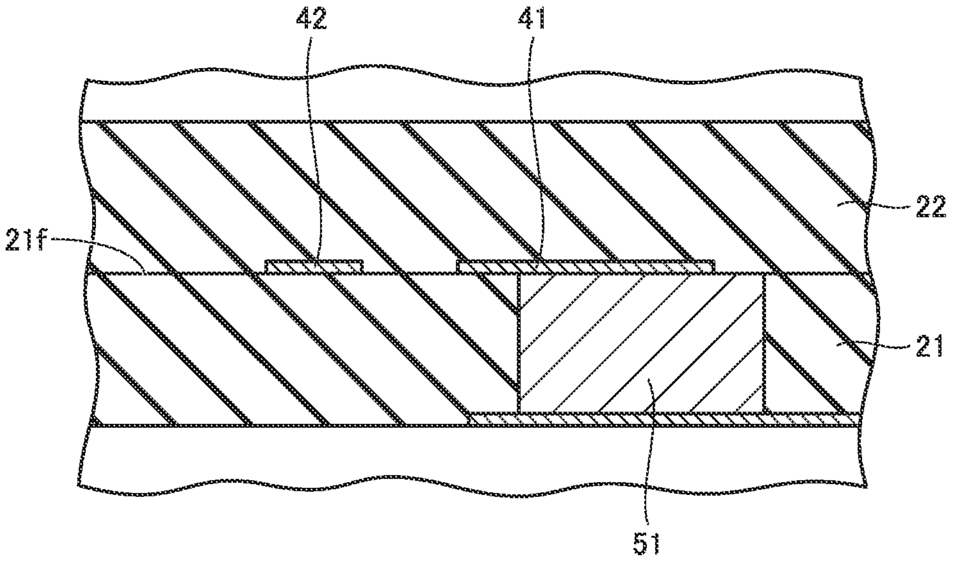
FIG. 3 is a partial cross sectional view in the case of a first configuration of the electronic component according to the first embodiment of the present disclosure.
Figure 4:
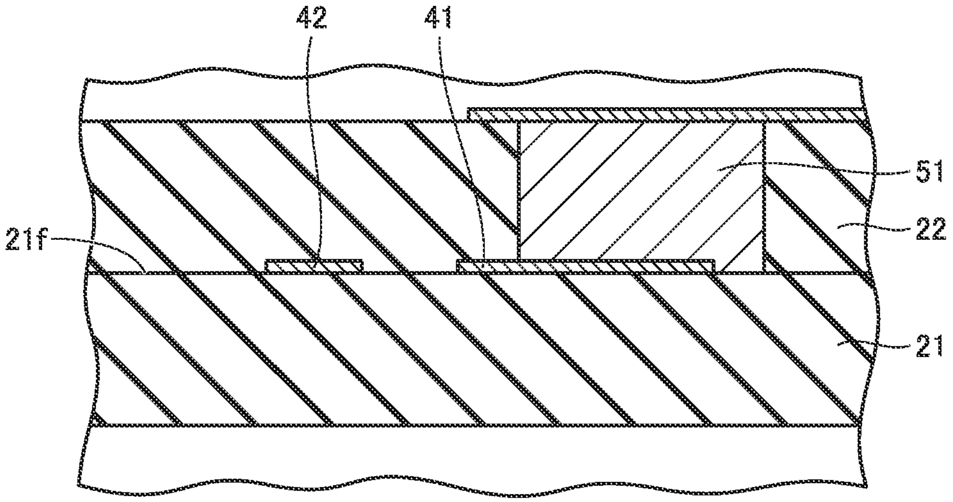
FIG. 4 is a partial cross sectional view in the case of a second configuration of the electronic component according to the first embodiment of the present disclosure.

Electronic component 101 includes a stacked body 1 in which a plurality of insulating layers 2 are stacked. FIG. 2 shows an exploded view in which a first insulating layer 21 and a second insulating layer 22 selected from the plurality of insulating layers 2 are extracted. Actually, a multiplicity of conductor patterns may be present on a surface of one insulating layer 2; however, for convenience of explanation, only two conductor patterns to which attention should be paid are shown in a simplified manner. As shown in FIG. 1, the plurality of insulating layers 2 include first insulating layer 21. As shown in FIG. 2, first insulating layer 21 has a first surface 21*f*. A first conductor pattern portion 41 and a second conductor pattern portion 42 are disposed on first surface 21*f*, second conductor pattern portion 42 being adjacent to first conductor pattern portion 41 with second conductor pattern portion 42 being separated from first conductor pattern portion 41. A first interlayer connection conductor is disposed to extend through one of first insulating layer 21 and second insulating layer 22 in a thickness direction of stacked body 1, second insulating layer 22 being an insulating layer 2 in contact with first surface 21*f* as one of the plurality of insulating layers 2. That is, it is considered that there are two cases for the position of the first interlayer connection conductor as described above. FIG. 3 is a cross sectional view of a corresponding portion in the case where a first interlayer connection conductor 51 extends through first insulating layer 21. FIG. 4 is a cross sectional view of a corresponding portion in the case where first interlayer connection conductor 51 extends through second insulating layer 22. The manner of first interlayer connection conductor 51 extending through first insulating layer 21 or second insulating layer 22 may be either of FIGS. 3 and 4.

Figure 5:
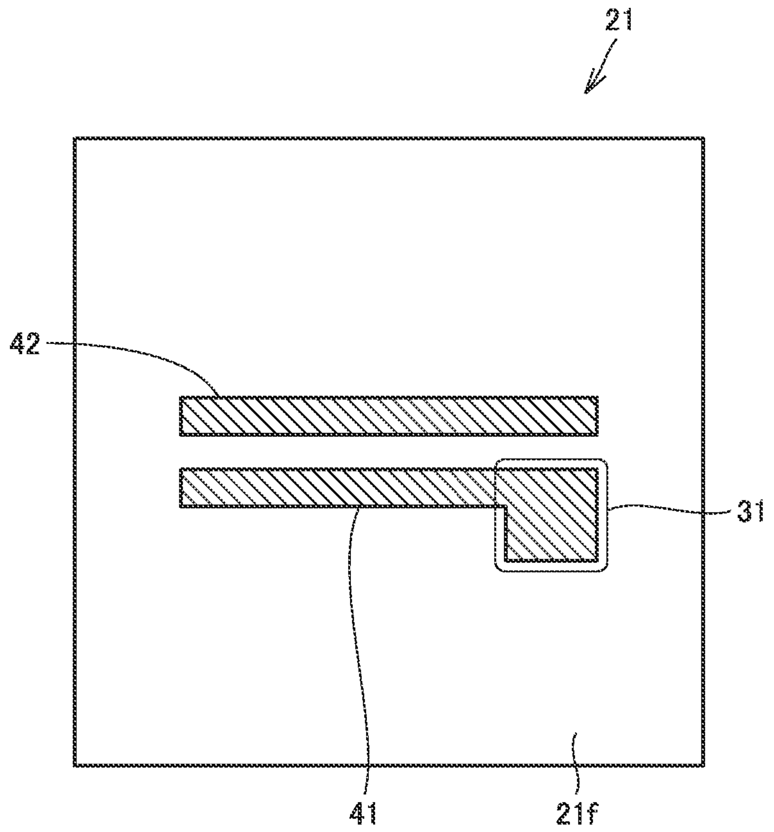
FIG. 5 is an explanatory diagram of a first region set on a first surface of the electronic component according to the first embodiment of the present disclosure.

As shown in FIG. 5, first conductor pattern portion 41 has a first region 31 for connection to first interlayer connection conductor 51. Here, first region 31 is shown as having a substantially square shape; however, this is just an example, and the shape of first region 31 may be another shape. For example, first region 31 may have any shape such as a rectangle shape, a polygonal shape, a circular shape, or an elliptical shape. This way of thinking also applies to other embodiments described below.

Figure 6:
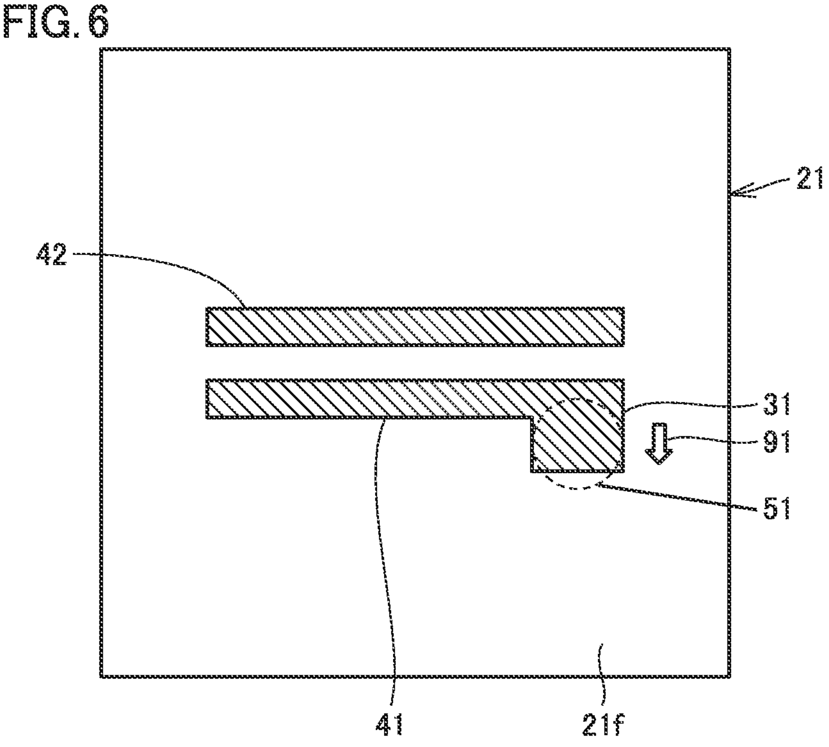
FIG. 6 is a plan view of the first surface of the electronic component according to the first embodiment of the present disclosure.

As shown in FIG. 6, when viewed in a direction perpendicular to first surface 21*f*, first interlayer connection conductor 51 is connected to first conductor pattern portion 41 in a state in which first interlayer connection conductor 51 is displaced from the center of first region 31 in a direction away from second conductor pattern portion 42. In FIG. 6, the direction away from second conductor pattern portion 42 is a direction of arrow 91.

Figure 7:
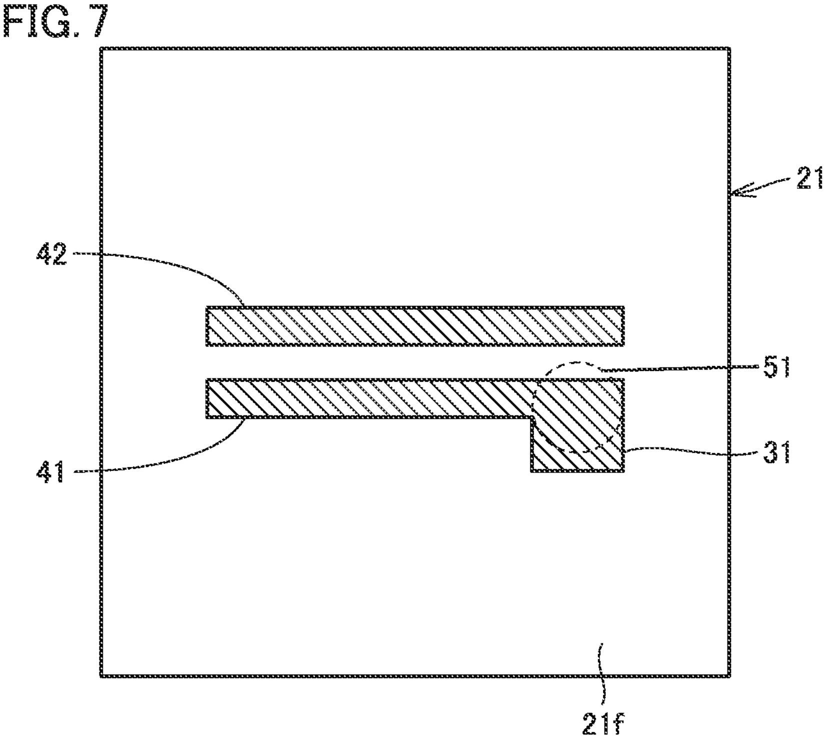
FIG. 7 is an explanatory diagram showing a case where a first interlayer connection conductor is displaced in a direction toward a second conductor pattern portion due to an error on the first surface of the electronic component according to the first embodiment of the present disclosure.
Figure 8:
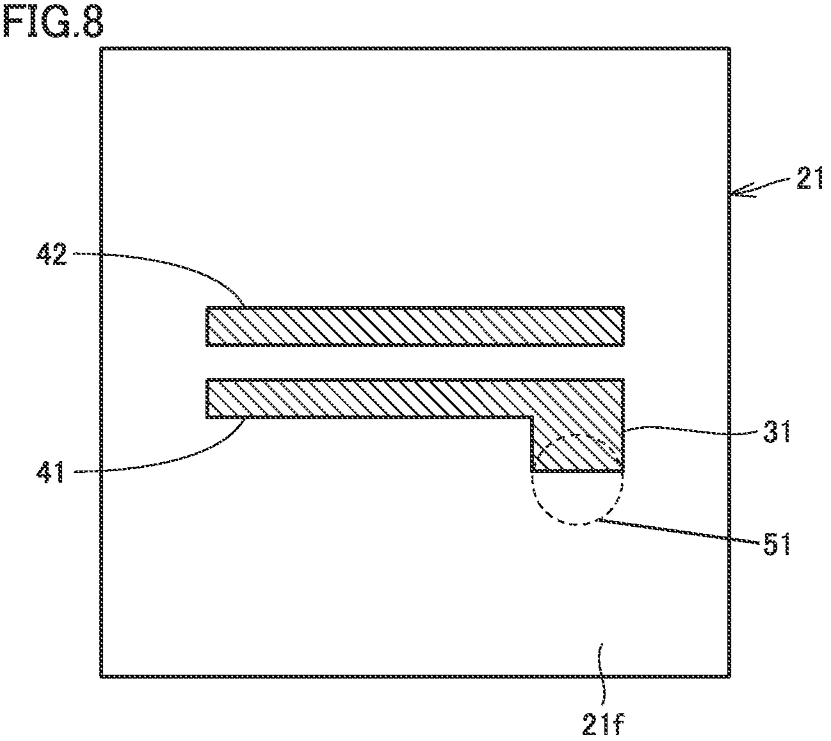
FIG. 8 is an explanatory diagram showing a case where the first interlayer connection conductor is displaced in a direction away from the second conductor pattern portion due to an error on the first surface of the electronic component according to the first embodiment of the present disclosure.

In the present embodiment, since first interlayer connection conductor 51 is connected to first conductor pattern portion 41 in the state in which first interlayer connection conductor 51 is displaced from the center of first region 31 in the direction away from second conductor pattern portion 42, first interlayer connection conductor 51 is less likely to be electrically connected to second conductor pattern portion 42 even when first interlayer connection conductor 51 is displaced from the designed position due to an error, with the result that short circuit is likely to be avoided. For example, even when displacement from the designed position occurs in a direction toward second conductor pattern portion 42 due to an error, a situation shown in FIG. 7 is resulted. Even in this situation, first interlayer connection conductor 51 does not overlap with second conductor pattern portion 42, and no short circuit occurs. On the other hand, when displacement from the designed position occurs in the direction away from second conductor pattern portion 42 due to an error, a situation shown in FIG. 8 is resulted. Even in this situation, since first interlayer connection conductor 51 and first region 31 overlap with each other to some extent, electrical connection between first interlayer connection conductor 51 and first conductor pattern portion 41 can be secured. In this way, in the present embodiment, the risk of short circuit can be avoided while achieving a high density.

Second Embodiment

Figure 9:
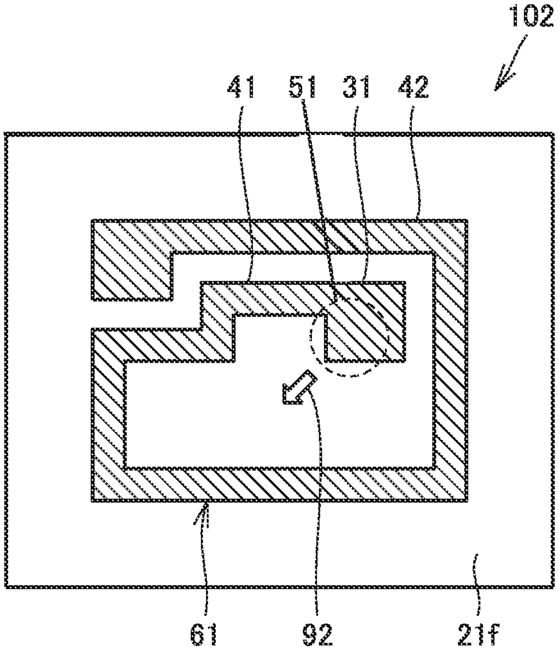
FIG. 9 is a plan view of a first surface of an electronic component according to a second embodiment of the present disclosure.

An electronic component according to a second embodiment of the present disclosure will be described with reference to FIG. 9. The basic configuration of an electronic component 102 in the present embodiment is the same as that described in the first embodiment. That is, electronic component 102 includes stacked body 1 in which the plurality of insulating layers 2 are stacked, and first insulating layer 21 is included in the plurality of insulating layers 2. FIG. 9 shows a state of first surface 21*f* of first insulating layer 21 in electronic component 102.

First conductor pattern portion 41 is a portion of a first coil 61. Second conductor pattern portion 42 is a portion of first coil 61, which is different from first conductor pattern portion 41. First conductor pattern portion 41 and second conductor pattern portion 42 may be in one piece. First conductor pattern portion 41 extends on the inner side, and second conductor pattern portion 42 extends on the outer side. First conductor pattern portion 41 has first region 31. First interlayer connection conductor 51 is electrically connected to first conductor pattern portion 41 in first region 31. It should be noted that first interlayer connection conductor 51 is connected to first conductor pattern portion 41 in a state in which first interlayer connection conductor 51 is displaced from the center of first region 31. The direction in which first interlayer connection conductor 51 is displaced from the center of first region 31 is a direction toward the inner side of first coil 61.

Here, the "direction toward the inner side of first coil 61" may not be a direction toward the center point thereof exactly and includes a direction indicated by an arrow 92 in FIG. 9. That is, the direction toward the inner side of first coil 61 includes a general direction seemingly toward the inner side when roughly considering whether the direction is toward the inner side or outer side of the coil.

Also in the present embodiment, the same effect as that described in the first embodiment can be obtained. In the present embodiment, since the direction in which first interlayer connection conductor 51 is displaced from the center of first region 31 is the direction toward the inner side of first coil 61, short circuit can be avoided between first interlayer connection conductor 51 and the other conductor pattern portion. In this case, first conductor pattern portion 41 and second conductor pattern portion 42 are conductor patterns formed in one piece but are portions that should be distinguished as the portion extending on the inner side and the portion extending on the outer side, so that it is not preferable that they are short-circuited. Since first interlayer connection conductor 51 is displaced from the center of first region 31 in the direction toward the inner side of first coil 61, short circuit can be avoided.

Third Embodiment

Figure 10:
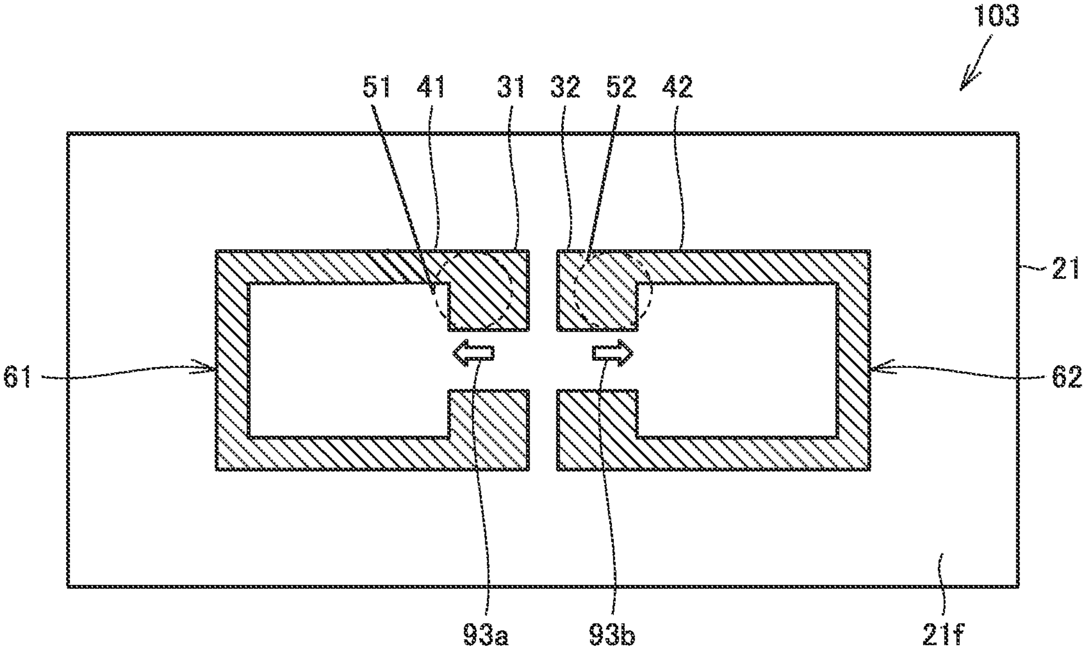
FIG. 10 is a plan view of a first surface of an electronic component according to a third embodiment of the present disclosure.

An electronic component according to a third embodiment of the present disclosure will be described with reference to FIG. 10. The basic configuration of an electronic component 103 in the present embodiment is the same as that described in the first embodiment. That is, electronic component 103 includes stacked body 1 in which the plurality of insulating layers 2 are stacked, and first insulating layer 21 is included in the plurality of insulating layers 2. FIG. 10 shows a state of first surface 21*f* of first insulating layer 21 in electronic component 103. Electronic component 103 includes a first coil 61 and a second coil 62.

A first conductor pattern portion 41 and a second conductor pattern portion 42 are disposed on first surface 21*f*, first conductor pattern portion 41 being a portion of first coil 61, second conductor pattern portion 42 being a portion of second coil 62. First conductor pattern portion 41 has first region 31. First interlayer connection conductor 51 is connected to first conductor pattern portion 41 in first region 31. Second conductor pattern portion 42 has a second region 32. A second interlayer connection conductor 52 is connected to first conductor pattern portion 41 in second region 32.

In the present embodiment, second conductor pattern portion 42 is a portion of second coil 62 disposed adjacent to first coil 61.

Also in the present embodiment, the same effect as that described in the first embodiment can be obtained. In the present embodiment, since second conductor pattern portion 42 is a portion of second coil 62, the two coils can be favorably arranged side by side. Since first interlayer connection conductor 51 is not displaced to the outer side of first coil 61 but is displaced to the inner side of first coil 61, an area occupied by first coil 61 on first surface 21*f* is not substantially increased. Therefore, a clearance can be small between the coil to which first interlayer connection conductor 51 belongs, i.e., first coil 61 and the other coil, i.e., second coil 62. In this way, contribution to a high density can be made in the present embodiment.

It should be noted that in the example shown in FIG. 10, second interlayer connection conductor 52 is disposed to extend through one of first insulating layer 21 and second insulating layer 22 in the thickness direction of stacked body 1, the one of first insulating layer 21 and second insulating layer 22 being an insulating layer encompassing first interlayer connection conductor 51. That is, second interlayer connection conductor 52 is disposed in the same layer as first interlayer connection conductor 51. Second conductor pattern portion 42 has second region 32 for connection to second interlayer connection conductor 52. When viewed in the direction perpendicular to first surface 21*f*, second interlayer connection conductor 52 is connected to second conductor pattern portion 42 in a state in which second interlayer connection conductor 52 is displaced from the center of second region 32 in a direction away from first conductor pattern portion 41. By employing this configuration, second interlayer connection conductor 52 can be avoided from being short-circuited with first coil 61 in the same manner as the manner in which first interlayer connection conductor 51 is avoided from being short-circuited with second coil 62.

Fourth Embodiment

Figure 11:
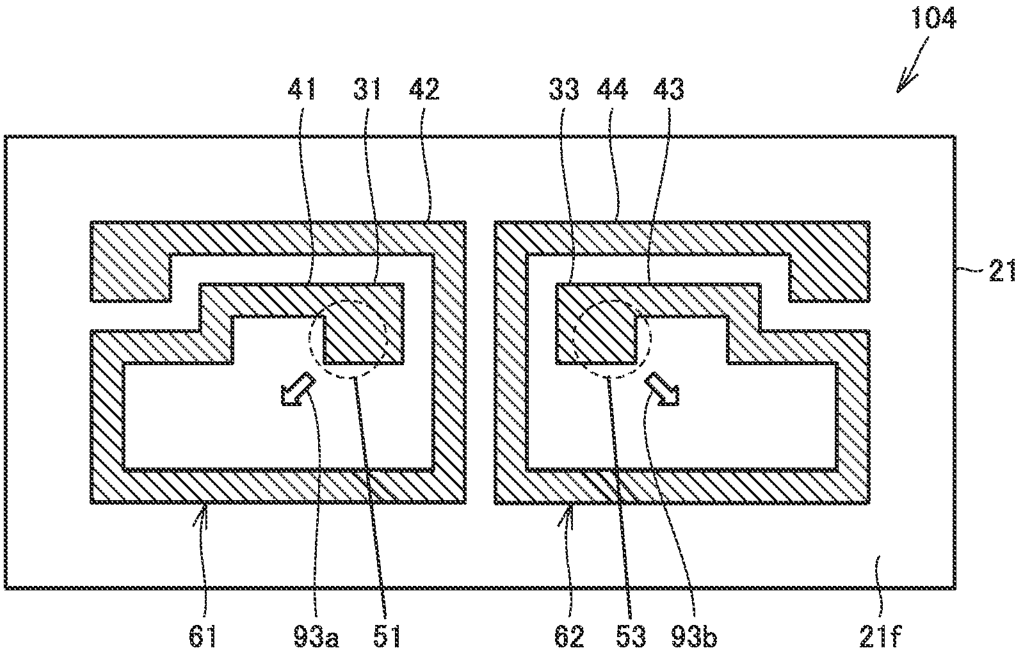
FIG. 11 is a plan view of a first surface of an electronic component according to a fourth embodiment of the present disclosure.

Referring to FIG. 11, an electronic component according to a fourth embodiment of the present disclosure will be described. The basic configuration of an electronic component 104 in the present embodiment is the same as that described in the first embodiment. That is, electronic component 104 includes stacked body 1 in which the plurality of insulating layers 2 are stacked, and first insulating layer 21 is included in the plurality of insulating layers 2. FIG. 11 shows a state of first surface 21*f* of first insulating layer 21 in electronic component 104.

Electronic component 104 includes a first coil 61 and a second coil 62. First coil 61 shown in the left half of FIG. 11 is the same as that described in the second embodiment with reference to FIG. 9. In the present embodiment, as shown in the right half of FIG. 11, second coil 62 is disposed as another coil adjacent to first coil 61. First coil 61 includes first conductor pattern portion 41 and second conductor pattern portion 42. Second coil 62 includes a third conductor pattern portion 43 and a fourth conductor pattern portion 44. In the example shown here, first conductor pattern portion 41 and second conductor pattern portion 42 are formed in one piece, and third conductor pattern portion 43 and fourth conductor pattern portion 44 are formed in one piece.

Third conductor pattern portion 43 and fourth conductor pattern portion 44 are disposed on first surface 21*f*, fourth conductor pattern portion 44 being adjacent to third conductor pattern portion 43 with fourth conductor pattern portion 44 being separated from third conductor pattern portion 43. A third interlayer connection conductor 53 is disposed to extend through one of first insulating layer 21 and second insulating layer 22 in the thickness direction of stacked body 1, the one of first insulating layer 21 and second insulating layer 22 being an insulating layer encompassing first interlayer connection conductor 51. That is, third interlayer connection conductor 53 is disposed in the same layer as first interlayer connection conductor 51. Third conductor pattern portion 43 has a third region 33 for connection to third interlayer connection conductor 53. When viewed in the direction perpendicular to first surface 21*f*, third interlayer connection conductor 53 is connected to third conductor pattern portion 43 in a state in which third interlayer connection conductor 53 is displaced from the center of third region 33 in a direction away from fourth conductor pattern portion 44. The direction in which first interlayer connection conductor 51 is displaced from the center of first region 31 is different from the direction in which third interlayer connection conductor 53 is displaced from the center of third region 33.

Also in the present embodiment, the same effect as that described in the first embodiment can be obtained. In the present embodiment, since first interlayer connection conductor 51 and third interlayer connection conductor 53 are displaced in different directions, an appropriate direction can be selected as a displacement direction, and short circuit can be efficiently avoided.

Here, it has been illustratively described that third conductor pattern portion 43 and fourth conductor pattern portion 44 are respectively symmetrical to first conductor pattern portion 41 and second conductor pattern portion 42, but are not limited to being symmetrical thereto. Fourth conductor pattern portion 44 may not have a shape of line as shown in FIG. 11, and may be a so-called plate-shaped ground conductor, for example. That is, fourth conductor pattern portion 44 may extend two-dimensionally toward its surrounding region.

Fifth Embodiment

Figure 12:
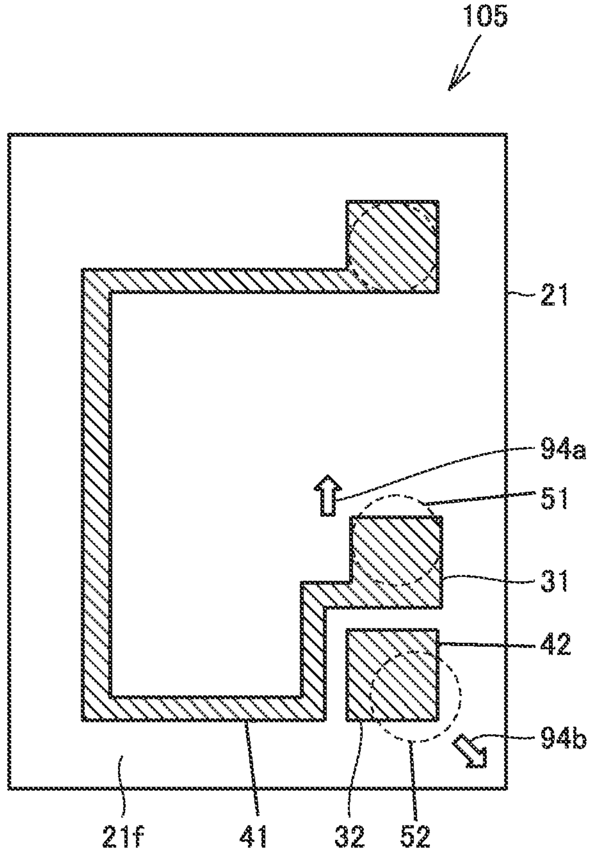
FIG. 12 is a plan view of a first surface of an electronic component according to a fifth embodiment of the present disclosure.

An electronic component according to a fifth embodiment of the present disclosure will be described with reference to FIG. 12. The basic configuration of an electronic component 105 in the present embodiment is the same as that described in the first embodiment. That is, electronic component 105 includes stacked body 1 in which the plurality of insulating layers 2 are stacked, and first insulating layer 21 is included in the plurality of insulating layers 2. FIG. 12 shows a state of first surface 21*f* of first insulating layer 21 in electronic component 105.

Second interlayer connection conductor 52 is disposed to extend through one of first insulating layer 21 and second insulating layer 22 in the thickness direction of stacked body 1, the one of first insulating layer 21 and second insulating layer 22 being an insulating layer encompassing first interlayer connection conductor 51. That is, second interlayer connection conductor 52 is disposed in the same layer as first interlayer connection conductor 51. Second conductor pattern portion 42 has second region 32 for connection to second interlayer connection conductor 52. In the example shown in FIG. 12, the whole of second conductor pattern portion 42 is second region 32 and such a configuration may be accepted. When viewed in the direction perpendicular to first surface 21*f*, second interlayer connection conductor 52 is connected to second conductor pattern portion 42 in a state in which second interlayer connection conductor 52 is displaced from the center of second region 32 in a direction away from first conductor pattern portion 41. When viewed from first interlayer connection conductor 51, second conductor pattern portion 42 is located on the lower side in the figure, so that first interlayer connection conductor 51 is displaced to the upper side in the figure, i.e., in a direction of arrow 94*a*. When viewed from second interlayer connection conductor 52, first conductor pattern portion 41 is disposed therearound in an L shape on the upper side and the left side in the figure, so that second interlayer connection conductor 52 is displaced to the lower right side in the figure, i.e., in a direction of arrow 94*b*. Thus, the direction in which first interlayer connection conductor 51 is displaced is different in the direction in which second interlayer connection conductor 52 is displaced.

Also in the present embodiment, the same effect as that described in the first embodiment can be obtained. It is conceivable to prevent short circuit by designing a wide region for connection to the interlayer connection conductor in the conductor pattern portion; however, this design runs counter to achieving a high density.

However, in the present embodiment, even though the region for connection to the interlayer connection conductor in the conductor pattern portion is not designed to be particularly wide, the risk of short circuit can be avoided while achieving a high density because the interlayer connection conductor is disposed to be displaced to be separated away from the other adjacent conductor pattern portion.

(Configuration in which Region for Connection is not Wide)

Figure 13:
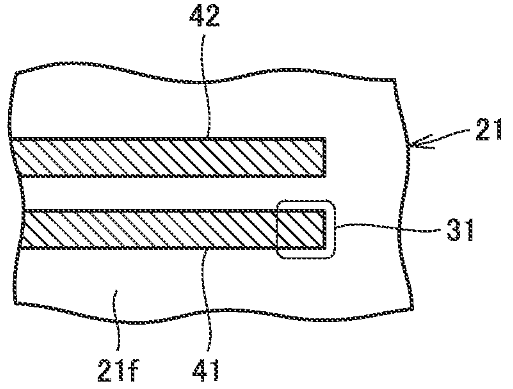
FIG. 13 is an explanatory diagram for a configuration in which a region for connection to an interlayer connection conductor in a conductor pattern portion is not wider than a wiring portion.
Figure 14:
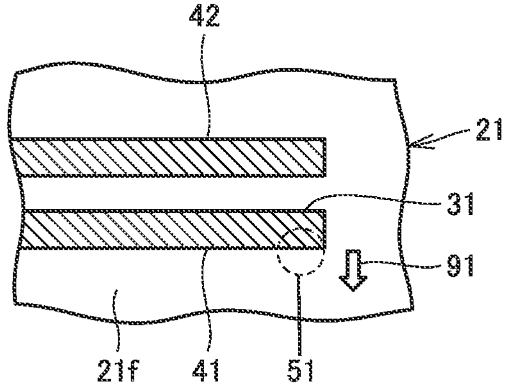
FIG. 14 is a plan view showing a positional relation with the interlayer connection conductor in the configuration in which the region for connection to the interlayer connection conductor in the conductor pattern portion is not wider than the wiring portion.

It should be noted that in each of the embodiments described above, the region for connection to the interlayer connection conductor in the conductor pattern portion having a shape of line has been illustrated as being wider than the other portion, i.e., wiring portion, but may have the same width as that of the wiring portion as shown in FIG. 13. In the example shown in FIG. 13, first conductor pattern portion 41 and second conductor pattern portion 42 adjacent thereto are disposed, and first region 31 is set to an end portion of first conductor pattern portion 41 as the region for connection to first interlayer connection conductor 51. In this configuration, as shown in FIG. 14, first interlayer connection conductor 51 is connected to first conductor pattern portion 41 in a state in which first interlayer connection conductor 51 is displaced from the center of first region 31. The direction of displacement is a direction away from second conductor pattern portion 42, i.e., a direction of arrow 91.

(As to Different Layer)

Figure 15:
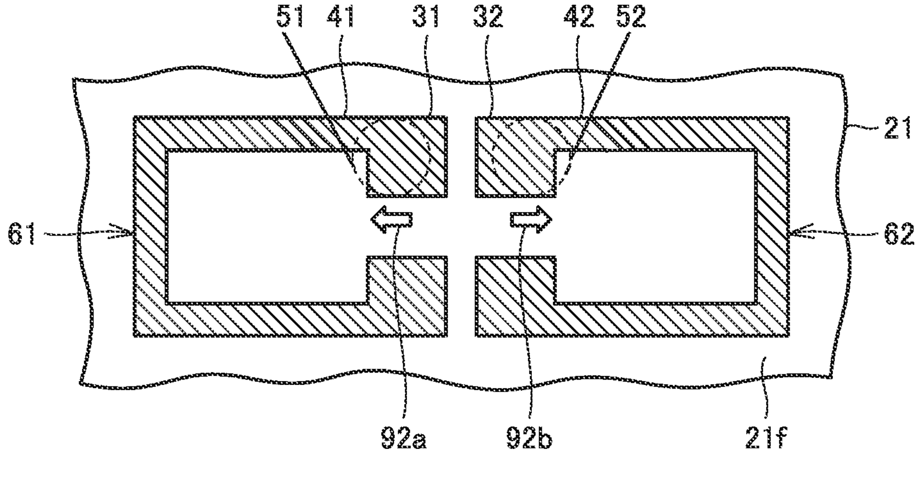
FIG. 15 is a first explanatory diagram for an influence of the displacement of the interlayer connection conductor over a different, adjacent layer in a thickness direction.
Figure 16:
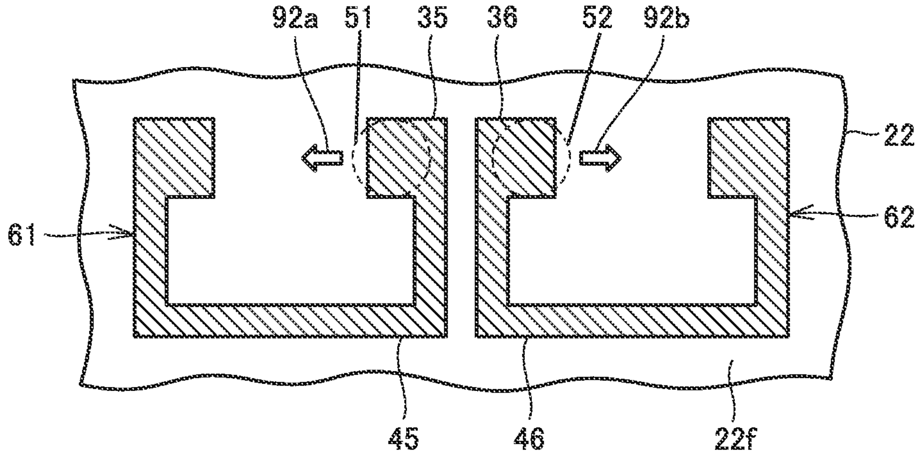
FIG. 16 is a second explanatory diagram for an influence of the displacement of the interlayer connection conductor over a different, adjacent layer in the thickness direction.

For example, it is assumed that the conductor pattern portions are disposed in first insulating layer 21 as shown in FIG. 15. It is assumed that first interlayer connection conductor 51 is disposed to extend through the first insulating layer, first interlayer connection conductor 51 in first insulating layer 21 is displaced from the center of first region 31 in a direction of arrow 92*a*, and second interlayer connection conductor 52 is displaced from the center of second region 32 in a direction of arrow 92*b*. A layer located just next to first insulating layer 21 in the thickness direction of stacked body 1, i.e., second insulating layer 22 is in a situation shown in FIG. 16, for example. First interlayer connection conductor 51 and second interlayer connection conductor 52 shown therein are the same between FIGS. 15 and 16. The displacement of the position of the interlayer connection conductor also influences the layer just next thereto. The displacement of the position of each of first interlayer connection conductor 51 and second interlayer connection conductor 52 influences both the situations in FIGS. 15 and 16. In the example shown in FIGS. 15 and 16, first interlayer connection conductor 51 is displaced in the direction of arrow 92*a* and second interlayer connection conductor 52 is displaced in the direction of arrow 92*b* in each of the layers. It should be noted that with the arrangement of the conductor pattern shown in FIGS. 15 and 16, the interlayer connection conductor can be displaced without any problem. As shown in FIG. 16, a fifth conductor pattern portion 45 has a fifth region 35, and a sixth conductor pattern portion 46 has a sixth region 36 on second surface 22*f* of second insulating layer 22. It should be noted that no "fourth region" appears in the present specification and the fourth region is absent.

The configuration described with reference to FIGS. 15 and 16 can be summarized as follows. Second insulating layer 22 has a second surface 22*f* located at a height different from a height of first surface 21*f*, fifth conductor pattern portion 45 and sixth conductor pattern portion 46 are disposed on second surface 22*f*, sixth conductor pattern portion 46 being adjacent to fifth conductor pattern portion 45 with sixth conductor pattern portion 46 being separated from fifth conductor pattern portion 45. Fifth conductor pattern portion 45 has fifth region 35 for connection to first interlayer connection conductor 51. When viewed in a direction perpendicular to second surface 22*f*, first interlayer connection conductor 51 is connected to fifth conductor pattern portion 45 in a state in which first interlayer connection conductor 51 is displaced from the center of fifth region 35 in the direction away from sixth conductor pattern portion 46. By employing this configuration, the risk of short circuit can be avoided while achieving a high density across the plurality of layers in the electronic component having the multilayer structure.

It should be noted that in the example shown in FIG. 16, when viewed in the direction perpendicular to second surface 22*f*, second interlayer connection conductor 52 is connected to sixth conductor pattern portion 46 in a state in which second interlayer connection conductor 52 is displaced from the center of sixth region 36 in the direction away from fifth conductor pattern portion 45.

Sixth Embodiment

Figure 17:
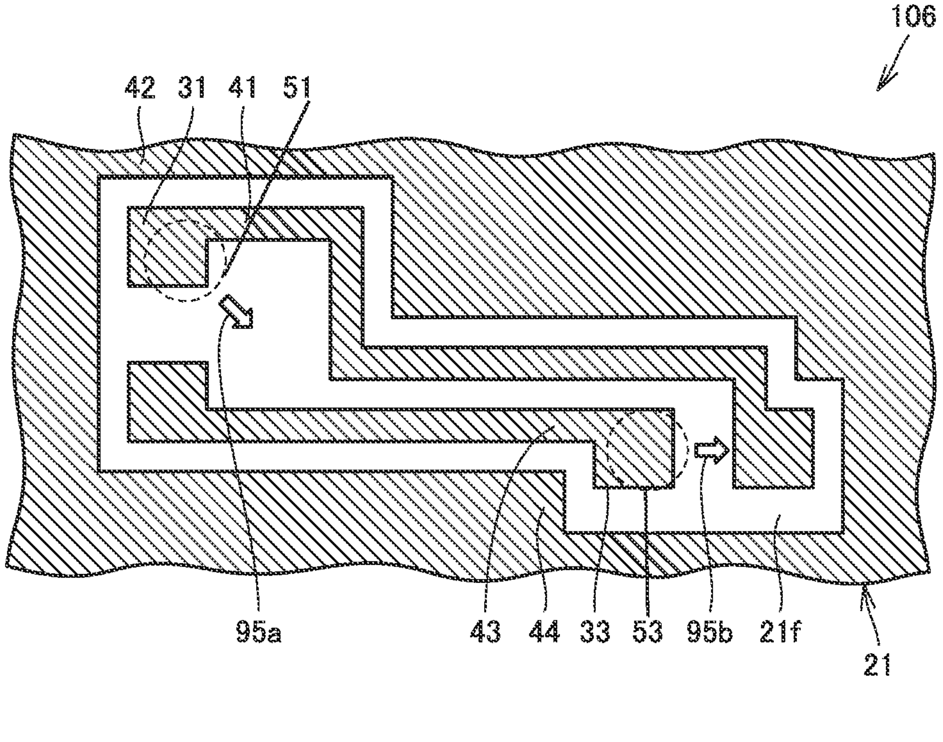
FIG. 17 is a plan view of a first surface of an electronic component according to a sixth embodiment of the present disclosure.

An electronic component according to a sixth embodiment of the present disclosure will be described with reference to FIG. 17. The basic configuration of an electronic component 106 in the present embodiment is the same as that described in the first embodiment. That is, electronic component 106 includes stacked body 1 in which the plurality of insulating layers 2 are stacked, and first insulating layer 21 is included in the plurality of insulating layers 2. FIG. 17 shows a state of first surface 21*f* of first insulating layer 21 in electronic component 106.

In the present embodiment, third conductor pattern portion 43 and fourth conductor pattern portion 44 are disposed on first surface 21*f*, fourth conductor pattern portion 44 being adjacent to third conductor pattern portion 43 with fourth conductor pattern portion 44 being separated from third conductor pattern portion 43. Third interlayer connection conductor 53 is disposed to extend through one of first insulating layer 21 and second insulating layer 22 in the thickness direction of stacked body 1, the one of first insulating layer 21 and second insulating layer 22 being an insulating layer encompassing first interlayer connection conductor 51. Third conductor pattern portion 43 has third region 33 for connection to third interlayer connection conductor 53. When viewed in the direction perpendicular to first surface 21*f*, third interlayer connection conductor 53 is connected to third conductor pattern portion 43 in a state in which third interlayer connection conductor 53 is displaced from the center of third region 33 in a direction away from fourth conductor pattern portion 44. The direction in which first interlayer connection conductor 51 is displaced from the center of first region 31 is different from the direction in which third interlayer connection conductor 53 is displaced from the center of third region 33.

When viewed from first interlayer connection conductor 51, second conductor pattern portion 42 exists close thereto on the upper side and the left side in the figure, so that first interlayer connection conductor 51 is displaced to the lower right side in the figure, i.e., in a direction of arrow 95*a*. On the other hand, when viewed from third interlayer connection conductor 53, fourth conductor pattern portion 44 exists close thereto on the left side in the figure, so that third interlayer connection conductor 53 is displaced to the right side in the figure, i.e., in a direction of arrow 95*b*.

Also in the present embodiment, the same effect as that described in the first embodiment can be obtained.

It should be noted that a plurality of embodiments of the above embodiments may be appropriately combined and employed.

It should be noted that the embodiments disclosed herein are by way of illustration and example only and are not to be taken by way of limitation. The scope of the present disclosure is defined by the terms of the claims, and is intended to include any modifications within the scope and meaning equivalent to the terms of the claims.

1: stacked body; 2: insulating layer; 21: first insulating layer; 21*f*: first surface; 22: second insulating layer; 22*f*: second surface; 31: first region; 32: second region; 33: third region; 35: fifth region; 36: sixth region; 41: first conductor pattern portion; 42: second conductor pattern portion; 43: third conductor pattern portion; 44: fourth conductor pattern portion; 45: fifth conductor pattern portion; 46: sixth conductor pattern portion; 51: first interlayer connection conductor; 52: second interlayer connection conductor; 53: third interlayer connection conductor; 61: first coil; 62: second coil; 91, 92*a*, 92*b*, 93, 93*a*, 93*b*, 94*a*, 94*b*, 95*a*, 95*b*: arrow; 101, 102, 103, 104, 105, 106: electronic component.

The invention claimed is:

1. An electronic component comprising a stacked body having a plurality of insulating layers stacked, wherein the plurality of insulating layers include a first insulating layer having a first surface, a first conductor pattern portion and a second conductor pattern portion are disposed on the first surface, the second conductor pattern portion being adjacent to the first conductor pattern portion with the second conductor pattern portion being separated from the first conductor pattern portion, a first interlayer connection conductor is disposed to extend through one of the first insulating layer and a second insulating layer in a thickness direction of the stacked body, the second insulating layer being an insulating layer in contact with the first surface as one of the plurality of insulating layers, the first conductor pattern portion has a first region for connection to the first interlayer connection conductor, and when viewed in a direction perpendicular to the first surface, the first interlayer connection conductor is connected to the first conductor pattern portion in a state in which the first interlayer connection conductor is displaced from a center of the first region in a direction away from the second conductor pattern portion.

2. The electronic component according to claim 1, wherein the first conductor pattern portion is a portion of a first coil, and the direction in which the first interlayer connection conductor is displaced from the center of the first region is a direction toward an inner side of the first coil.

3. The electronic component according to claim 2, wherein the second conductor pattern portion is a portion of a second coil disposed adjacent to the first coil.

4. The electronic component according to claim 2, wherein a second interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the second conductor pattern portion has a second region for connection to the second interlayer connection conductor, and when viewed in the direction perpendicular to the first surface, the second interlayer connection conductor is connected to the second conductor pattern portion in a state in which the second interlayer connection conductor is displaced from a center of the second region in a direction away from the first conductor pattern portion.

5. The electronic component according to claim 2, wherein a third conductor pattern portion and a fourth conductor pattern portion are disposed on the first surface, the fourth conductor pattern portion being adjacent to the third conductor pattern portion with the fourth conductor pattern portion being separated from the third conductor pattern portion, a third interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the third conductor pattern portion has a third region for connection to the third interlayer connection conductor, when viewed in the direction perpendicular to the first surface, the third interlayer connection conductor is connected to the third conductor pattern portion in a state in which the third interlayer connection conductor is displaced from a center of the third region in a direction away from the fourth conductor pattern portion, and the direction in which the first interlayer connection conductor is displaced from the center of the first region is different from the direction in which the third interlayer connection conductor is displaced from the center of the third region.

6. The electronic component according to claim 2, wherein the second insulating layer has a second surface located at a height different from a height of the first surface, a fifth conductor pattern portion and a sixth conductor pattern portion are disposed on the second surface, the sixth conductor pattern portion being adjacent to the fifth conductor pattern portion with the sixth conductor pattern portion being separated from the fifth conductor pattern portion, the fifth conductor pattern portion has a fifth region for connection to the first interlayer connection conductor, and when viewed in a direction perpendicular to the second surface, the first interlayer connection conductor is connected to the fifth conductor pattern portion in a state in which the first interlayer connection conductor is displaced from a center of the fifth region in a direction away from the sixth conductor pattern portion.

7. The electronic component according to claim 3, wherein a second interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the second conductor pattern portion has a second region for connection to the second interlayer connection conductor, and when viewed in the direction perpendicular to the first surface, the second interlayer connection conductor is connected to the second conductor pattern portion in a state in which the second interlayer connection conductor is displaced from a center of the second region in a direction away from the first conductor pattern portion.

8. The electronic component according to claim 3, wherein a third conductor pattern portion and a fourth conductor pattern portion are disposed on the first surface, the fourth conductor pattern portion being adjacent to the third conductor pattern portion with the fourth conductor pattern portion being separated from the third conductor pattern portion, a third interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the third conductor pattern portion has a third region for connection to the third interlayer connection conductor, when viewed in the direction perpendicular to the first surface, the third interlayer connection conductor is connected to the third conductor pattern portion in a state in which the third interlayer connection conductor is displaced from a center of the third region in a direction away from the fourth conductor pattern portion, and the direction in which the first interlayer connection conductor is displaced from the center of the first region is different from the direction in which the third interlayer connection conductor is displaced from the center of the third region.

9. The electronic component according to claim 3, wherein the second insulating layer has a second surface located at a height different from a height of the first surface, a fifth conductor pattern portion and a sixth conductor pattern portion are disposed on the second surface, the sixth conductor pattern portion being adjacent to the fifth conductor pattern portion with the sixth conductor pattern portion being separated from the fifth conductor pattern portion, the fifth conductor pattern portion has a fifth region for connection to the first interlayer connection conductor, and when viewed in a direction perpendicular to the second surface, the first interlayer connection conductor is connected to the fifth conductor pattern portion in a state in which the first interlayer connection conductor is displaced from a center of the fifth region in a direction away from the sixth conductor pattern portion.

10. The electronic component according to claim 1, wherein a second interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the second conductor pattern portion has a second region for connection to the second interlayer connection conductor, and when viewed in the direction perpendicular to the first surface, the second interlayer connection conductor is connected to the second conductor pattern portion in a state in which the second interlayer connection conductor is displaced from a center of the second region in a direction away from the first conductor pattern portion.

11. The electronic component according to claim 10, wherein a third conductor pattern portion and a fourth conductor pattern portion are disposed on the first surface, the fourth conductor pattern portion being adjacent to the third conductor pattern portion with the fourth conductor pattern portion being separated from the third conductor pattern portion, a third interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the third conductor pattern portion has a third region for connection to the third interlayer connection conductor, when viewed in the direction perpendicular to the first surface, the third interlayer connection conductor is connected to the third conductor pattern portion in a state in which the third interlayer connection conductor is displaced from a center of the third region in a direction away from the fourth conductor pattern portion, and the direction in which the first interlayer connection conductor is displaced from the center of the first region is different from the direction in which the third interlayer connection conductor is displaced from the center of the third region.

12. The electronic component according to claim 10, wherein the second insulating layer has a second surface located at a height different from a height of the first surface, a fifth conductor pattern portion and a sixth conductor pattern portion are disposed on the second surface, the sixth conductor pattern portion being adjacent to the fifth conductor pattern portion with the sixth conductor pattern portion being separated from the fifth conductor pattern portion, the fifth conductor pattern portion has a fifth region for connection to the first interlayer connection conductor, and when viewed in a direction perpendicular to the second surface, the first interlayer connection conductor is connected to the fifth conductor pattern portion in a state in which the first interlayer connection conductor is displaced from a center of the fifth region in a direction away from the sixth conductor pattern portion.

13. The electronic component according to claim 1, wherein a third conductor pattern portion and a fourth conductor pattern portion are disposed on the first surface, the fourth conductor pattern portion being adjacent to the third conductor pattern portion with the fourth conductor pattern portion being separated from the third conductor pattern portion, a third interlayer connection conductor is disposed to extend through one of the first insulating layer and the second insulating layer in the thickness direction of the stacked body, the one of the first insulating layer and the second insulating layer being an insulating layer encompassing the first interlayer connection conductor, the third conductor pattern portion has a third region for connection to the third interlayer connection conductor, when viewed in the direction perpendicular to the first surface, the third interlayer connection conductor is connected to the third conductor pattern portion in a state in which the third interlayer connection conductor is displaced from a center of the third region in a direction away from the fourth conductor pattern portion, and the direction in which the first interlayer connection conductor is displaced from the center of the first region is different from the direction in which the third interlayer connection conductor is displaced from the center of the third region.

14. The electronic component according to claim 13, wherein the second insulating layer has a second surface located at a height different from a height of the first surface, a fifth conductor pattern portion and a sixth conductor pattern portion are disposed on the second surface, the sixth conductor pattern portion being adjacent to the fifth conductor pattern portion with the sixth conductor pattern portion being separated from the fifth conductor pattern portion, the fifth conductor pattern portion has a fifth region for connection to the first interlayer connection conductor, and when viewed in a direction perpendicular to the second surface, the first interlayer connection conductor is connected to the fifth conductor pattern portion in a state in which the first interlayer connection conductor is displaced from a center of the fifth region in a direction away from the sixth conductor pattern portion.

15. The electronic component according to claim 1, wherein the second insulating layer has a second surface located at a height different from a height of the first surface, a fifth conductor pattern portion and a sixth conductor pattern portion are disposed on the second surface, the sixth conductor pattern portion being adjacent to the fifth conductor pattern portion with the sixth conductor pattern portion being separated from the fifth conductor pattern portion, the fifth conductor pattern portion has a fifth region for connection to the first interlayer connection conductor, and when viewed in a direction perpendicular to the second surface, the first interlayer connection conductor is connected to the fifth conductor pattern portion in a state in which the first interlayer connection conductor is displaced from a center of the fifth region in a direction away from the sixth conductor pattern portion.

16. The electronic component according to claim 1, wherein in the first conductor pattern portion, a width of the first region is larger than a width of another portion.

17. The electronic component according to claim 1, wherein in the first conductor pattern portion, a width of the first region is the same as a width of another portion.

* * * * *